(12) United States Patent
Orr et al.

(10) Patent No.: US 8,292,593 B2
(45) Date of Patent: Oct. 23, 2012

(54) SYSTEM FOR MINIMIZING MECHANICAL AND ACOUSTICAL FAN NOISE COUPLING

(75) Inventors: Derek Orr, Linlithgow (GB); Stuart J. McGurnaghan, Glenrothes (GB)

(73) Assignee: Oracle America, Inc., Redwood City, CA (US)

( * ) Notice: Subject to any disclaimer, the term of this patent is extended or adjusted under 35 U.S.C. 154(b) by 475 days.

(21) Appl. No.: 12/549,542

(22) Filed: Aug. 28, 2009

(65) Prior Publication Data

US 2011/0051357 A1    Mar. 3, 2011

(51) Int. Cl.
F04D 27/00 (2006.01)
H02P 5/00 (2006.01)

(52) U.S. Cl. .............. 417/2; 318/67; 318/268; 417/44.1

(58) Field of Classification Search .................. 417/2, 5, 417/42, 44.1; 318/611, 623, 629, 448, 268, 318/59, 67
See application file for complete search history.

(56) References Cited

U.S. PATENT DOCUMENTS

| | | | | |
|---|---|---|---|---|
| 5,625,542 A | * | 4/1997 | Stemmler et al. | 363/41 |
| 6,257,832 B1 | * | 7/2001 | Lyszkowski et al. | 417/2 |
| 6,270,319 B1 | * | 8/2001 | Lyszkowski et al. | 417/2 |
| 6,428,282 B1 | * | 8/2002 | Langley | 417/2 |
| 6,433,507 B1 | * | 8/2002 | Makaran et al. | 318/811 |
| 6,891,342 B2 | * | 5/2005 | Nakamura et al. | 318/77 |
| 6,920,049 B2 | * | 7/2005 | Brooks et al. | 361/727 |
| 7,088,062 B2 | * | 8/2006 | Makaran | 318/34 |
| 7,132,809 B1 | * | 11/2006 | Chang | 318/400.13 |
| 7,282,873 B2 | * | 10/2007 | Abali et al. | 318/41 |

OTHER PUBLICATIONS

Gaede, Kyle, "Suppressing Acoustic Noise in PWM Fan Speed Control Systems", Microchip Technology Inc, 2003.*

* cited by examiner

*Primary Examiner* — Devon Kramer
*Assistant Examiner* — Nathan Zollinger
(74) *Attorney, Agent, or Firm* — Marsh Fischmann & Breyfogle, LLP; Libby A. Huskey; Kent A. Lembke (57) ABSTRACT

A system and method of spread-spectrum fan control for an air-cooled system is provided for reducing the vibrational and acoustical noise associated with the air-cooled system. The method includes generating a first control signal that controls a blade-passing frequency of a first cooling fan and a second control signal that controls a blade-passing frequency of a second cooling fan, wherein the first and second control signals may be pulse width modulated ("PWM") signals. One or more noise generators independently vary duty cycles for the first and second PWM signals within a range around respective first and second blade-passing frequency set points. As a result, the blade-passing frequencies for the first and second cooling fans are independently and randomly modulated within a range around the respective first and second blade-passing frequency set points.

13 Claims, 8 Drawing Sheets

SYSTEM FOR MINIMIZING MECHANICAL AND ACOUSTICAL FAN NOISE COUPLING

BACKGROUND OF THE INVENTION

1. Field of the Invention

The present invention relates, in general, to methods and systems of fan control, and more particularly, to a design for utilizing spread-spectrum techniques to minimize the amplitude of mechanical and/or acoustical vibration coupled to a chassis of an electronic device at any given frequency.

2. Relevant Background

Computer systems such as rack server systems contain numerous heat-generating electronic components (e.g., power supplies, hard disk drives, Peripheral Component Interconnect ("PCI") or PCI Express cards). Generally, the excess heat that these components generate is actively dissipated through the use of one or more cooling fans that circulate air throughout the inside of a housing or chassis for the electronic system. The circulating air carries away the excess heat within the chassis, thereby reducing internal heat build-up that can lead to misoperation and long-term damage to the components.

Current fan control technologies commonly employ pulse width modulation ("PWM") control methods to control the speed of direct current ("DC") cooling fan motors. In response to an input voltage, a PWM signal generator generates a PWM control signal, which may be represented as a periodic rectangular wave having an alternating sequence of on-time and off-time. The fraction of time that the signal is active equates to the duty cycle of the PWM signal. For example, where the on-time pulse duration (t) is 1 second and the period (T) of the PWM signal is 2 seconds, the duty cycle is 50 percent.

Generally, conventional PWM algorithms use a constant control variable to set an input voltage to a PWM generator. In turn, the PWM generator outputs a PWM control signal having a constant duty cycle to the controlled cooling fan or fans. The constant control variable is often a function of temperature (e.g., the temperature within the chassis or of specific components within the system) and/or other measurable physical states of the system. In this regard, a fan speed controller may incorporate a fan speed sensor (e.g., a tachometer) as well as a thermal monitor (e.g., a diode connected transistor). The fan speed controller (e.g., an integrated circuit including the PWM generator) adjusts the control variable in response to a feedback temperature signal generated by the thermal monitor in order to increase or decrease the rotational speed of the cooling fan(s) as necessary to maintain a desired physical state (e.g., a thermal state) within the system. Thus, the PWM control signal for one or more controlled fans is either held constant, thereby maintaining a constant duty cycle of the PWM control signal, or is incrementally adjusted only as necessary to maintain the desired physical state within the system. In other words, when the thermal monitor indicates a desired temperature, the control variable—and thus the duty cycle of the resulting PWM control signal—remains static. This constant duty cycle results in a constant rotational speed of the controlled fan or fans.

The advancement of the computer and electronics industry demands ever-increasing numbers of heat-generating electronic components to be integrated into electronic devices such as server systems. As a result, air-cooled server systems continually command more cooling fans that require more power to accommodate faster rotational speeds. These increased airflow needs lead to increased mechanical and/or acoustical vibration or noise that is coupled to a chassis of the server system at any given rotational frequency.

SUMMARY OF THE INVENTION

The inventors have recognized that using a constant fan control variable results in blade-passing frequencies (i.e., the rate at which the fan blades pass by a fixed position) for one or more cooling fans that remain fixed for at least some period of time. The resulting vibrational and acoustical noise centers strongly on these constant blade-passing frequencies as well as harmonically related frequencies. Further, beat frequencies result from interference between fans or groups of fans that are maintaining different blade-passing frequencies. Many of today's server systems include higher numbers of more powerful cooling fans, while others include smaller fans having faster rotational speeds. These trends result in high amplitude mechanically-coupled vibration that leads to functional component failures. In addition, such mechanically-coupled vibration stimulates resonant frequencies in the chassis, hard-drives, or other electronic components within the system, worsening the failure problem. Similarly, resulting high amplitude acoustically-coupled vibration or noise is strongly tonal and perceptually affects customer acceptance of electronic devices such as server systems. These and other issues are addressed with a spread-spectrum fan control system and method for minimizing mechanical and/or acoustical fan noise coupling as discussed below and shown, for example, in FIGS. 1-7.

More particularly, an air-cooled server system housing one or more heat-generating electrical components is provided. The system includes a chassis housing the electrical components, first and second cooling fans disposed within the chassis and providing air cooling to the electrical components, a fan controller providing first and second control signals to control the respective first and second cooling fans, and one or more noise generators. The first and second control signals ($V_{PWM}$) may be PWM signals that control respective first and second blade-passing frequencies ($F_{BP}$) of the first and second cooling fans. In addition, the first and second PWM signals ($V_{PWM}$) may have respective first and second duty cycles. The one or more noise generators may cause the first and second duty cycles to vary in a manner that independently (i.e., each fan is controlled separately) and randomly modulates the first and second blade-passing frequencies ($F_{BP}$) within a range around a blade-passing frequency set point ($F_{BPSP}$). The system may also include one or more unmodulated cooling fans, where any mechanically-coupled vibration from the unmodulated fans is masked by the modulated fans.

One variation of the fan controller may include a fan control integrated circuit having a control system that provides a control voltage to one or more PWM generators. The one or more noise generators may include additive noise sources directly or indirectly coupled to each of the cooling fans or, alternately, a noise generator that is implemented in hardware or firmware and coupled with the PWM generator of the fan control integrated circuit. Another variation of the fan controller may include a fan control processor executing fan control software. In this variation, the one or more noise generators may include noise generation software implemented on the fan control processor. The blade-passing frequency set point ($F_{BPSP}$) may be a function of a physical state within the server system, including, for example, a thermal state associated with one or both of the first and second cooling fans, and each of the cooling fans may have a different blade-passing frequency set point ($F_{BPSP}$). Further, a bandwidth of the range of blade-passing frequencies ($F_{BP}$) around the blade-passing frequency set point ($F_{BPSP}$) may be bounded by a percentage or proportion of the blade-passing frequency set point ($F_{BPSP}$), and the range of modulation (i.e., the range of blade-passing frequencies ($F_{BP}$) around the blade-passing frequency set point ($F_{BPSP}$)) may be different for each cooling fan. The independent and random modulation of the first and second blade-passing frequencies ($F_{BP}$) within the same or a different range around the blade-passing frequency set point ($F_{BPSP}$) may be defined by a Gaussian amplitude distribution.

In yet another variation, the first and second control signals may be direct voltage signals (e.g., constant control signals), where the one or more noise generators are additive noise generators that provide additive noise to the first and second control signals, thereby causing the first and second control signals to vary in a manner that independently and randomly modulates respective first and second blade-passing frequencies ($F_{BP}$) of the first and second cooling fans within a range around the blade-passing frequency set point ($F_{BPSP}$).

In addition, a method of spread-spectrum control for multiple cooling fans in an air-cooled system is provided. First, the method includes generating, with a fan controller, a first PWM signal ($V_{PWM}$) controlling a blade-passing frequency ($F_{BP}$) of a first cooling fan and a second PWM signal ($V_{PWM}$) controlling a blade-passing frequency ($F_{BP}$) of a second cooling fan. Second, the method includes varying, with one or more noise generators, a first duty cycle for the first PWM signal ($V_{PWM}$) to randomly modulate the blade-passing frequency ($F_{BP}$) for the first cooling fan within a range around a first blade-passing frequency set point ($F_{BPSP}$) Third, the method includes independently varying, with the one or more noise generators, a second duty cycle for the second PWM signal ($V_{PWM}$) to randomly modulate the blade-passing frequency ($F_{BP}$) for the second cooling fan within a range around a second blade-passing frequency set point ($F_{BPSP}$), wherein the first and second duty cycles are uncorrelated. The fan controller may be implemented in hardware or firmware on a fan control integrated circuit or with software executing on a fan control processor. Variations of the one or more noise generators may include independent additive noise sources (e.g., Gaussian voltage noise sources) directly or indirectly coupled to each of the cooling fans or they may be implemented in software executing on a fan control processor. To reduce attendant electromagnetic noise, a slew rate of the first and second PWM signals ($V_{PWM}$) or a maximum blade-passing frequency ($F_{BP}$) for the first and second cooling fans may be limited in any appropriate manner including, for example, programmatically or by limiting the bandwidth of the blade-passing frequency ($F_{BP}$) modulation.

Moreover, another method of spread-spectrum fan control is provided. The method includes generating, with a fan controller, a PWM signal ($V_{PWM}$) to control a blade-passing frequency ($F_{BP}$) of a fan, and randomly varying, with a noise generator, a duty cycle for the PWM signal ($V_{PWM}$) in order to randomly modulate the blade-passing frequency ($F_{BP}$) of the fan within a range about a blade-passing frequency set point ($F_{BPSP}$). The range around the blade-passing frequency set point ($F_{BPSP}$) may be defined by a proportion of the blade-passing frequency set point ($F_{BPSP}$).

DETAILED DESCRIPTION OF THE PREFERRED EMBODIMENTS

The inventors have recognized that employing higher numbers of more powerful cooling fans drives increasing levels of vibrational and acoustical noise. This noise tends to center around the constant blade-passing frequencies ($F_{BP}$) of each fan, as well as harmonically related frequencies and beat frequencies caused by the interference of large-amplitude blade-passing frequencies ($F_{BP}$) of different fans. Large amplitude mechanically coupled vibration leads to the functional failure of server components such as hard drives, PCI cards, and the like. In addition, high amplitude and strongly tonal acoustic noise presents perception challenges for customers and affects customer acceptance of server systems.

To address these and other issues, embodiments of the present invention are directed to a system and method for air-cooling an electronic device (e.g., a server system) including one or more heat-generating electrical components. The described cooling system and method decouples the relationship between a physical state (e.g., a temperature) inside the electronic device and an adjustment of a blade-passing frequency ($F_{BP}$) of one or more cooling fans disposed within the electronic device. In this regard, the blade-passing frequency ($F_{BP}$) of each cooling fan is continuously and randomly modulated within a defined range around a desired blade-passing frequency set point ($F_{BPSP}$). While the blade-passing frequency set point ($F_{BPSP}$) may, in one example, be a function of the temperature within the device, the constant changing of the blade-passing frequency ($F_{BP}$) occurs regardless of the temperature within the device. In other words, the blade-passing frequency ($F_{BP}$) of each fan is continuously and randomly modulated regardless of whether the temperature within the electronic device has fluctuated or is fluctuating.

The continuous, random, and independent modulation of the rotational frequencies of each of the cooling fans delivers the airflow required of existing fan control technologies, but reduces the amplitude of mechanical and/or acoustic vibration that is passed through a chassis of the electronic device (i.e., coupled vibration) at any given blade-passing frequency ($F_{BP}$). This introduces many more harmonics and beat frequencies than does conventional constant variable fan control, but the energy level at any one frequency is minimized, thereby reducing the amount of energy in the mechanically coupled vibration that translates to the chassis at any given frequency. Moreover, this reduced energy at each blade-passing frequency ($F_{BP}$) reduces the perceived audible noise level of the system. Notably, some embodiments may also include one or more unmodulated cooling fans. In these embodiments, the modulated fans may be used to mask any mechanically-coupled vibration caused by the unmodulated fans.

Figure 1A:
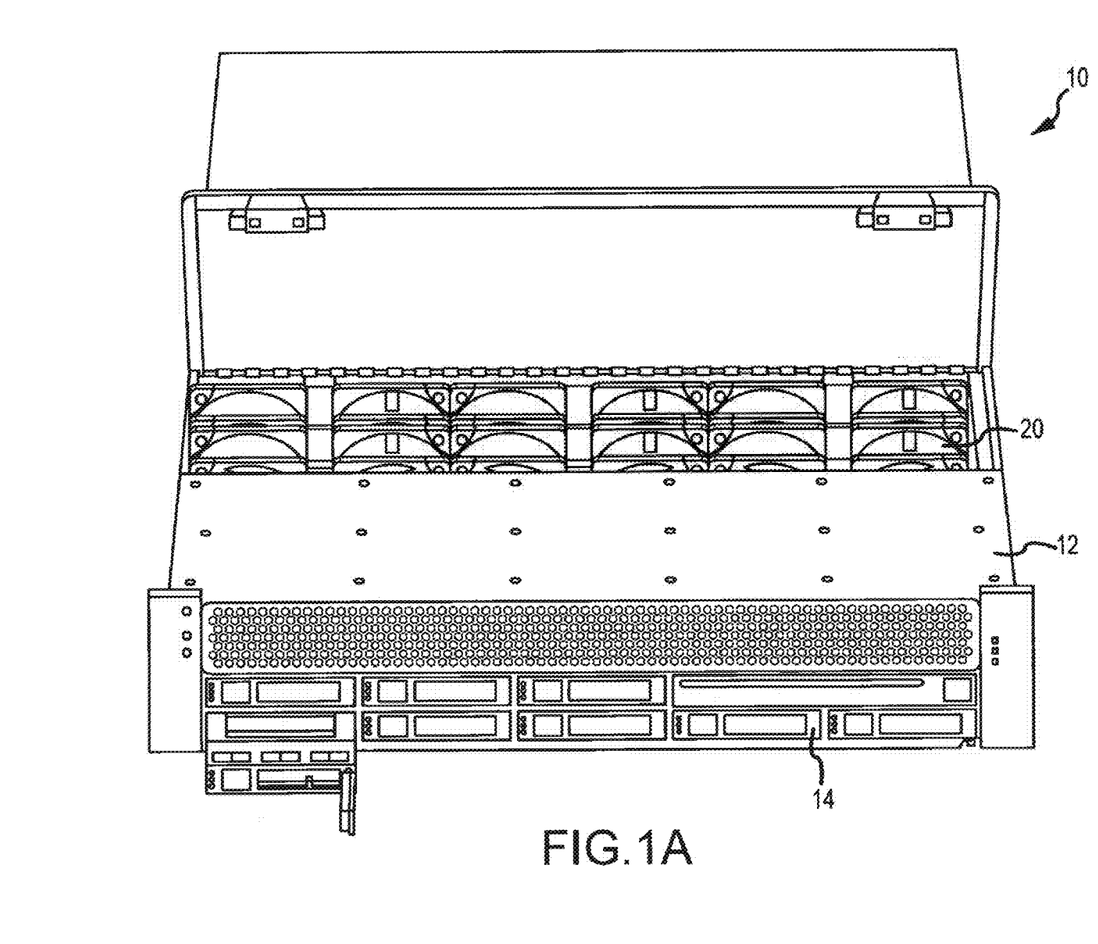
FIG. 1A illustrates front perspective view of one embodiment of an air-cooled server system.
Figure 1B:
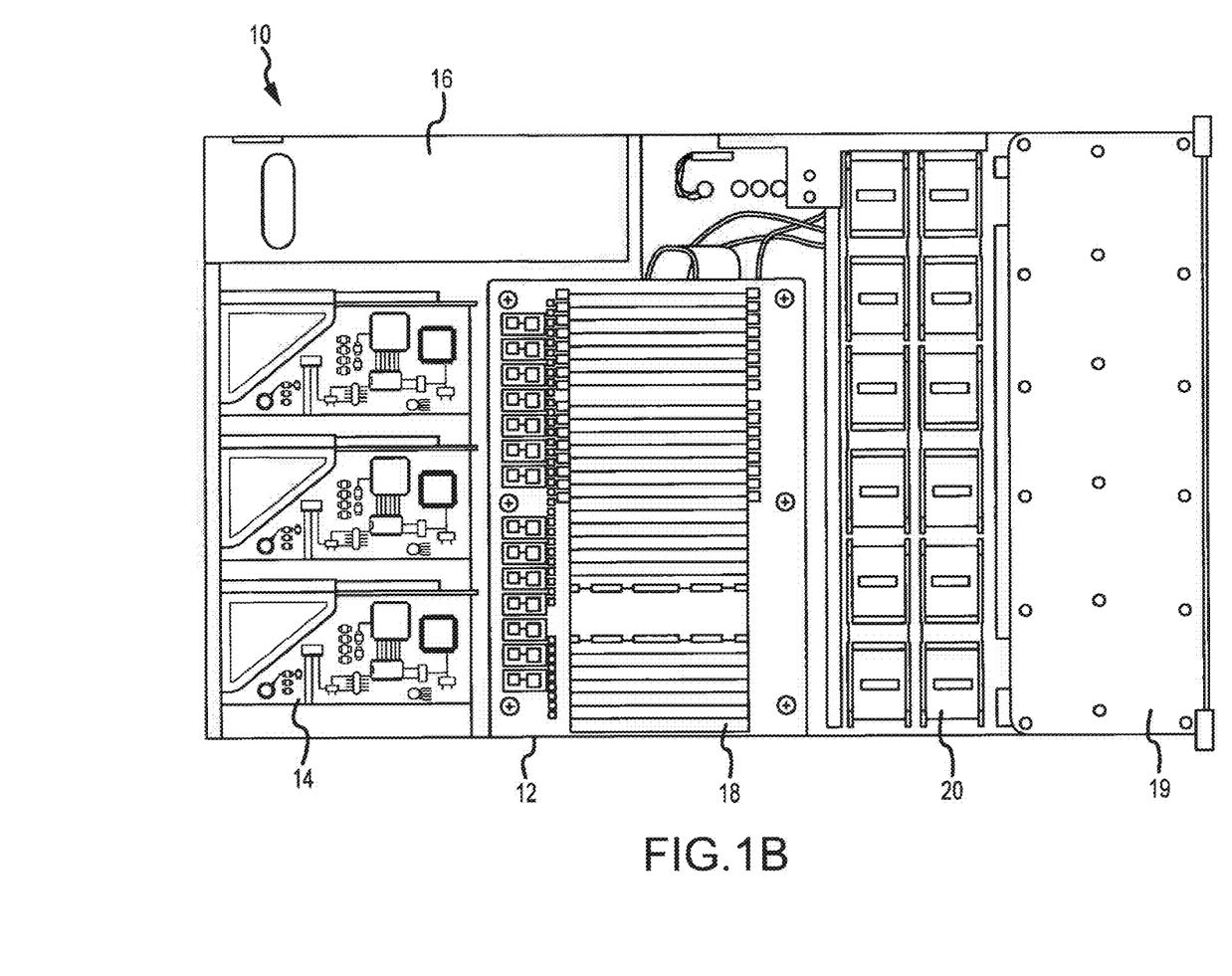
FIG. 1B illustrates a top view of the air-cooled server system of FIG. 1.

FIGS. 1A-B illustrate front perspective and top views of one embodiment of an air-cooled electronic device or computer server system (either "server" or "electronic device") 10. While the electronic device is primarily shown and described as a computer server system, the electronic device may be any air-cooled electronic device including a personal computer (e.g., desktop, laptop, notebook, handheld), electronic copier, laser printer, facsimile unit, video game system, and so on. The server 10 includes a chassis 12 that contains a number of heat-generating components. For example, in this embodiment, the server 10 includes a number of PCI and/or PCI Express cards 14. The PCI/PCI Express cards may include, for example, network cards, sound cards, modems, extra ports such as USB or serial ports, tuner cards, disk controllers, and the like. The server 10 may also include power supplies 16, processors 18 for running one or more applications, and hard disk drives (within a hard drive cage 19) for encoding and storing data. Several cooling fans 20 are disposed within the chassis 12 and circulate air throughout the inside of the chassis 12. The cooling fans 20 carry away excess heat generated by the heat-generating components and reduce damage to and misoperation of the components.

Figure 2:
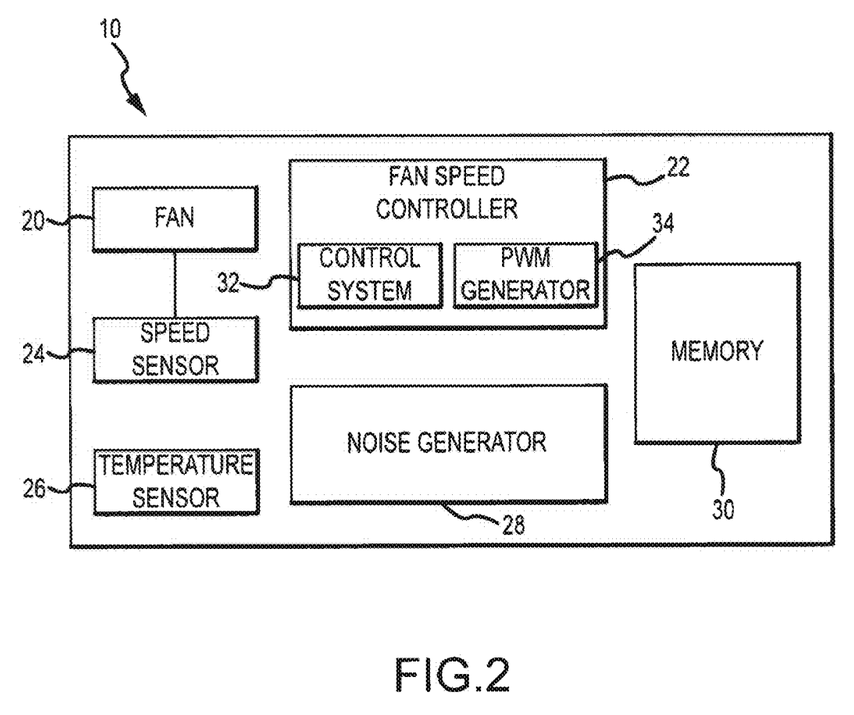
FIG. 2 illustrates a functional block diagram of the air-cooled server system of FIGS. 1A-B.

FIG. 2 shows a simplified functional block diagram of one embodiment of fan speed control for a cooling fan 20 within the server 10. In this embodiment, the server 10 includes a fan speed controller 22. The fan speed controller 22 provides a PWM control signal ($V_{PWM}$) to the fan 20 for controlling the blade-passing frequency ($F_{BP}$) of the fan 20. The fan speed controller 22 includes a control system 32 and a PWM generator 34. A noise generator 28 operates as part of or in conjunction with the fan speed controller 22 to continuously and randomly modulate the PWM control signal ($V_{PWM}$) such that the blade-passing frequency ($F_{BP}$) of the fan 20 is randomly modulated within a defined range of frequencies about a blade-passing frequency set point ($F_{BPSP}$).

The blade-passing frequency set point ($F_{BPSP}$) is computed using an underlying conventional fan control algorithm, which may be stored in a memory 30. Specifically, in one embodiment, the server 10 includes various system-state sensors such as a fan speed sensor 24 (e.g., a tachometer), a thermal sensor 26 (e.g., a diode connected transistor), and the like. Referring to defined control parameters for the system (e.g., a desired temperature inside the chassis 12 or associated with a particular heat-generating component) as well as a feedback signal, which may include, for example, a fan speed signal generated by the fan speed sensor 24 or a temperature signal generated by the thermal sensor 26, the control system 32 of the fan speed controller 22 determines the blade-passing frequency set point ($F_{BPSP}$) that is required to achieve a desired physical state within the server 10. To achieve that blade-passing frequency set point ($F_{BPSP}$), the control system 32 determines and provides an appropriate constant control voltage ($F_{CC}$) to the PWM generator 34. The constant control voltage ($F_{CC}$) corresponds (e.g., linearly or according to another formulaic relationship) to a duty cycle of the PWM control signal ($V_{PWM}$) that is required to operate the fan 20 at the blade-passing frequency set point ($F_{BPSP}$). Thus, upon receiving the constant control voltage ($F_{CC}$) from the control system 32, the PWM generator 34 outputs a PWM control signal ($V_{PWM}$) having the requisite duty cycle to operate the fan 20 at the blade-passing frequency set point ($F_{BPSP}$). Conventional fan control of the type described above is generally well known in the art and will not be described further.

As discussed above, operating one or more fans at a constant blade-passing frequency ($F_{BP}$) drives increasing levels of vibrational and acoustical noise that is centered on the constant blade-passing frequency set point ($F_{BPSP}$) of each fan. This level of energy at each blade-passing frequency ($F_{BP}$) also leads to large-amplitude harmonic and beat frequencies that intensify the problem. To lessen the mechanical and acoustical vibration while maintaining equal airflow through the chassis 12, the noise generator 28 incorporates noise into the PWM control signal ($V_{PWM}$) so as to randomly modulate the blade-passing frequency ($F_{BP}$) of the fan 20 within a range about the blade-passing frequency set point ($F_{BPSP}$). Noise may be added to the PWM control signal ($V_{PWM}$) in various ways, as is discussed below in reference to FIGS. 3-5.

Figure 3:
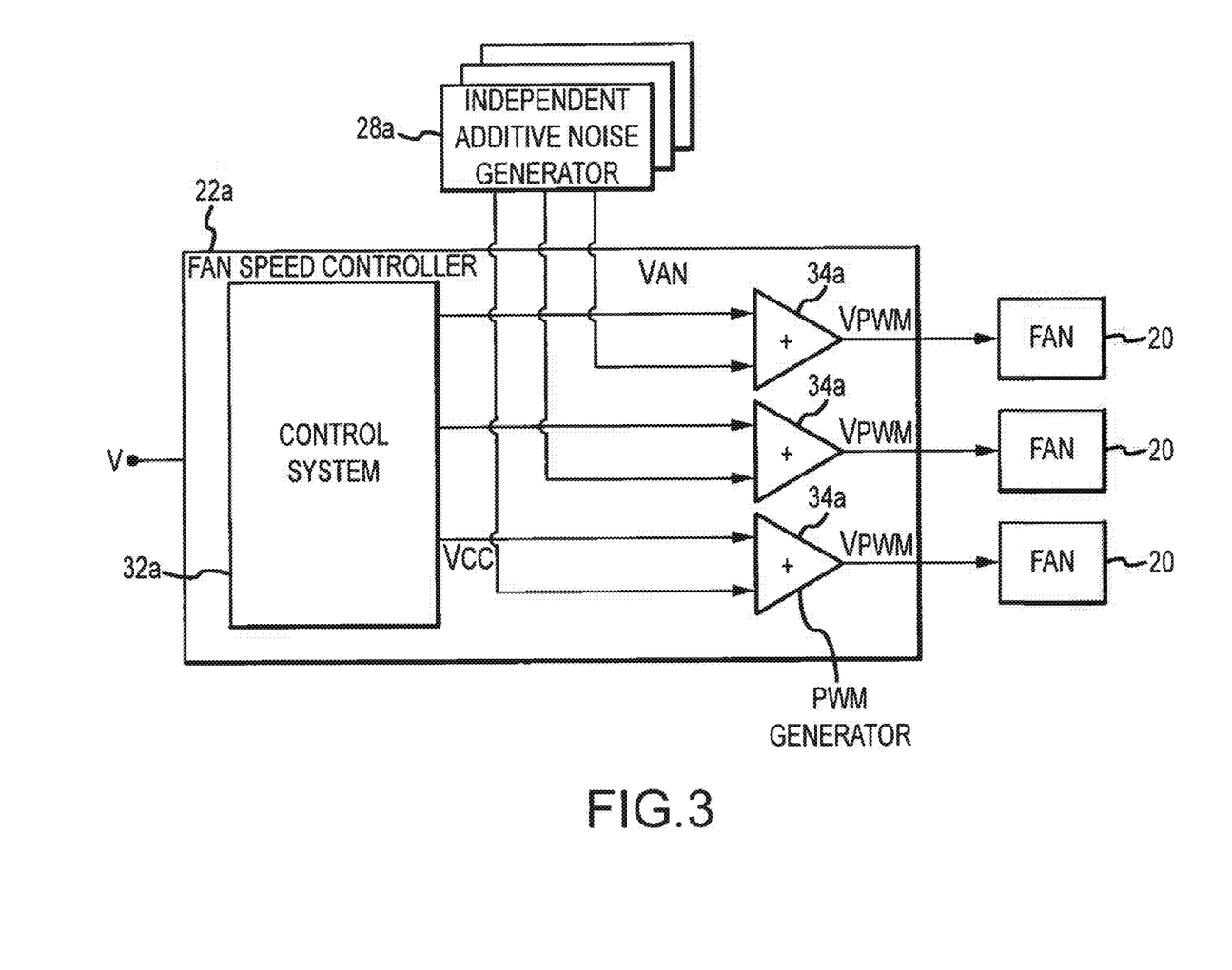
FIG. 3 illustrates a functional block diagram of one embodiment of spread-spectrum fan control for the air-cooled server system of FIGS. 1A-B.

FIG. 3 illustrates one embodiment of spread-spectrum fan control for adding noise to the PWM signal ($V_{PWM}$) output to multiple cooling fans 20 within a server (such as the server 10 of FIGS. 1A-2). Corresponding components between the embodiments of FIGS. 2 and 3 are identified by the same reference numerals. Those corresponding components that differ in some respect are identified by an "a". In this embodiment, a fan speed controller 22a includes a conventional control system 32a for determining and providing one or more constant control voltages ($V_{CC}$) to operate the multiple cooling fans 20 at one or more desired blade-passing frequency set points ($F_{BPSP}$), as discussed above. The constant control voltage ($V_{CC}$) is provided to a PWM generator 34a for each of the fans 20 within the server 10. In addition, an independent additive noise generator 28a is indirectly coupled with each of the fans 20 via the PWM generators 34a. The noise generators 28a may be any appropriate noise generators, including, for example, additive Gaussian noise generators, additive stochastic noise generators, or the like.

Each noise generator 28a provides a band of additive noise ($V_{AN}$) to the constant control voltage ($V_{CC}$) provided by the control system 32a for each of the cooling fans 20. The bandwidth of modulation may be defined in any appropriate manner. In one embodiment, the bandwidth of modulation is constrained by a proportion or percentage of the desired blade-passing frequency set point ($F_{BPSP}$). In turn, the band of additive noise ($V_{AN}$) input to the PWM generator 34a may span a percentage of the constant control voltage ($V_{CC}$) required to produce a PWM control signal ($V_{PWM}$) that results in the desired blade-passing frequency set point ($F_{BPSP}$). The additive noise ($V_{AN}$) randomizes the control voltage input to each of the PWM generators 34a, and as a result, each PWM generator 34a produces a PWM control signal ($V_{PWM}$) having a randomized duty cycle that produces a blade-passing frequency ($F_{BP}$) that is continuously and randomly modulated about the blade-passing frequency set point ($F_{BPSP}$) for the associated fan 20.

In one quantitative embodiment, each cooling fan 20 may be a small, high-speed cooling fan having seven blades. Based on an output from the temperature sensor 26 (FIG. 2) as compared to a defined temperature parameter or requirement for the inside of the chassis 12 (FIGS. 1A-B), the desired rotational speed for each cooling fan may be determined to be 15,000 revolutions/minute, or 15 krpm. This rotational speed translates to a blade-passing frequency set point ($F_{BPSP}$) of:

(Number of fan blades)×(rotational frequency)=7×15,000 revolutions/minute×(1 minute/60 seconds)= 1.75 kHz A designer may choose to modulate the blade-passing frequency ($F_{BP}$) by 10 percent of the blade-passing frequency set point ($F_{BPSP}$), or by 0.175 kHz, such that the blade-passing frequency is randomly modulated between 1.66 kHz and 1.84 kHz. In this scenario, each independent noise generator $28a$ may be set to provide +/−5 percent additive voltage noise ($V_{AN}$) to the constant control voltage ($V_{CC}$) output of the control system $32a$. The total voltage seen at each of the PWM generators $34a$ includes the constant control voltage ($V_{CC}$) plus the additive voltage noise ($V_{AN}$). As a result, each of the PWM generators $34a$ outputs a PWM control signal ($V_{PWM}$) having a randomly varied duty cycle that results in a blade-passing frequency ($F_{BP}$) that is randomly modulated about the blade-passing frequency set point ($F_{BPSP}$), or between 1.66 kHz and 1.84 kHz. Notably, because duty cycles of the PWM control signals ($V_{PWM}$) are independently and randomly varied, the duty cycles for each of the PWM control signals ($V_{PWM}$) are uncorrelated, and therefore, each of the fans 20 rotates at a different and continually changing speed.

In one embodiment, the creation of additional inappropriate electromagnetic noise may be avoided by limiting the range or bandwidth of fan speed modulation to a proportion or percentage of the desired blade-passing frequency set point ($F_{BPSP}$), as discussed above. Specifically, two ways to avoid additional electromagnetic noise include limiting the upper blade-passing frequency ($F_{BP}$) of the fan speed modulation and/or limiting the slew rate of the fan speed modulation. When the bandwidth of the modulation is constrained to a proportion of the desired blade-passing frequency set point ($F_{BPSP}$), as described above, the modulation width will change only incrementally as the blade-passing frequency set point ($F_{BPSP}$) changes to adapt to temperature fluctuations and other factors. This both bounds the upper or maximum blade-passing frequency ($F_{BP}$) and limits the slew rate of the fan speed modulation to limit additional electromagnetic noise that might be created by modulating the blade-passing frequencies ($F_{BP}$) of the cooling fans 20. In other embodiments, the maximum blade-passing frequency and slew rate may be limited programmatically or by any other appropriate means.

It should be understood that each of the cooling fans 20 disposed within the server 10 may have a different blade-passing frequency set point ($F_{BPSP}$) depending on the desired rotational speed for that particular fan 20. For instance, certain areas within the server 10 may contain a higher concentration of heat-generating components, and therefore, the cooling fans 20 disposed within those areas may require higher blade-passing frequency set points ($F_{BPSP}$) than other cooling fans 20 within the server 10. In addition, the blade-passing frequency ($F_{BP}$) of each cooling fan 20 may be randomly modulated within any appropriate range around the same or different blade-passing frequency set points $F_{BPSP}$). In this regard, the modulation of the blade-passing frequency should be sufficiently rapid to provide unaffected airflow, or to prevent undesirable short-term thermal oscillations or fluctuations within the device 10. Moreover, the range of randomization may be defined in any appropriate manner and may differ for each of the cooling fans 20 within the server 10.

Figure 4:
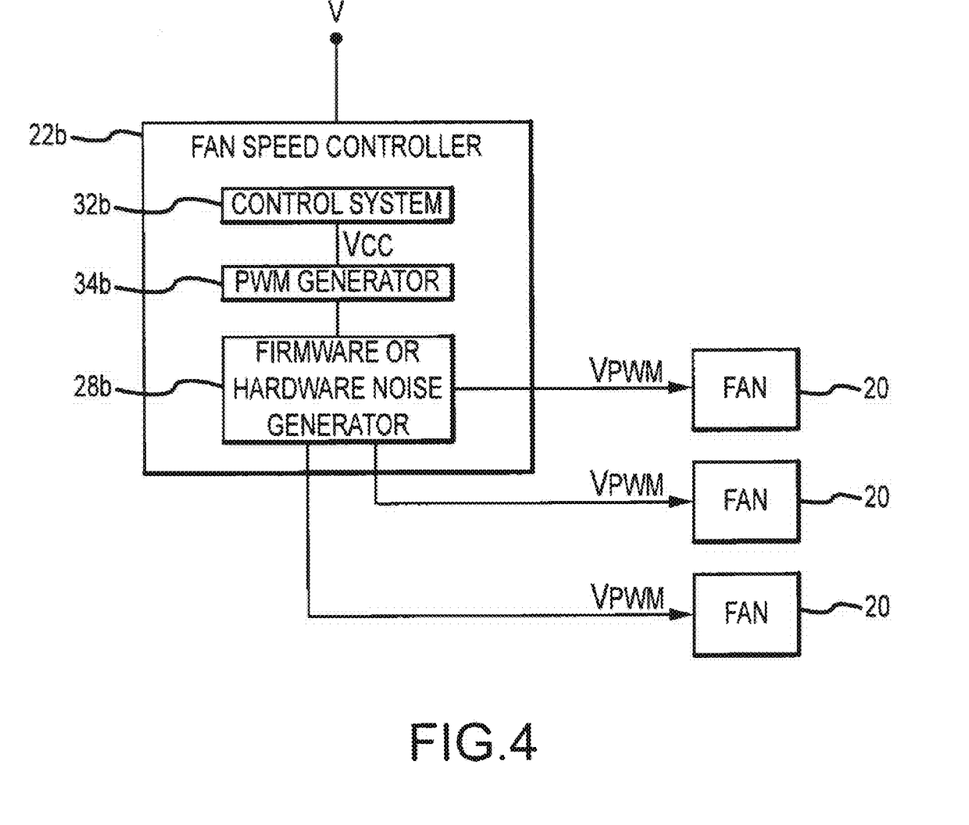
FIG. 4 illustrates a functional block diagram of another embodiment of spread-spectrum fan control for the air-cooled server system of FIGS. 1A-B.

FIG. 4 illustrates another embodiment of spread-spectrum fan control for adding noise to the PWM control signal(s) ($V_{PWM}$). Corresponding components between the embodiments of FIGS. 2 and 4 are identified by the same reference numerals. Those corresponding components that differ in some respect are identified by a "b." In this embodiment, the existing PWM duty cycle set point control is incorporated with or coupled to hardware or firmware that performs noise generation. For example, a fan speed controller $22b$ may be formed of an integrated circuit that incorporates a control system $32b$, a PWM generator $34b$, and a noise generator $28b$.

The noise generator $28b$ works in conjunction with the PWM generator $34b$ and may be implemented through any appropriate firmware or hardware that adds noise (e.g., Gaussian noise, stochastic noise) to vary the duty cycle of the PWM control signal ($V_{PWM}$) as discussed above. The noise generator $28b$ and/or PWM generator $34b$ may have multiple outputs to provide the same or a different PWM control signal ($V_{PWM}$) to each of the multiple cooling fans 20.

Figure 5:
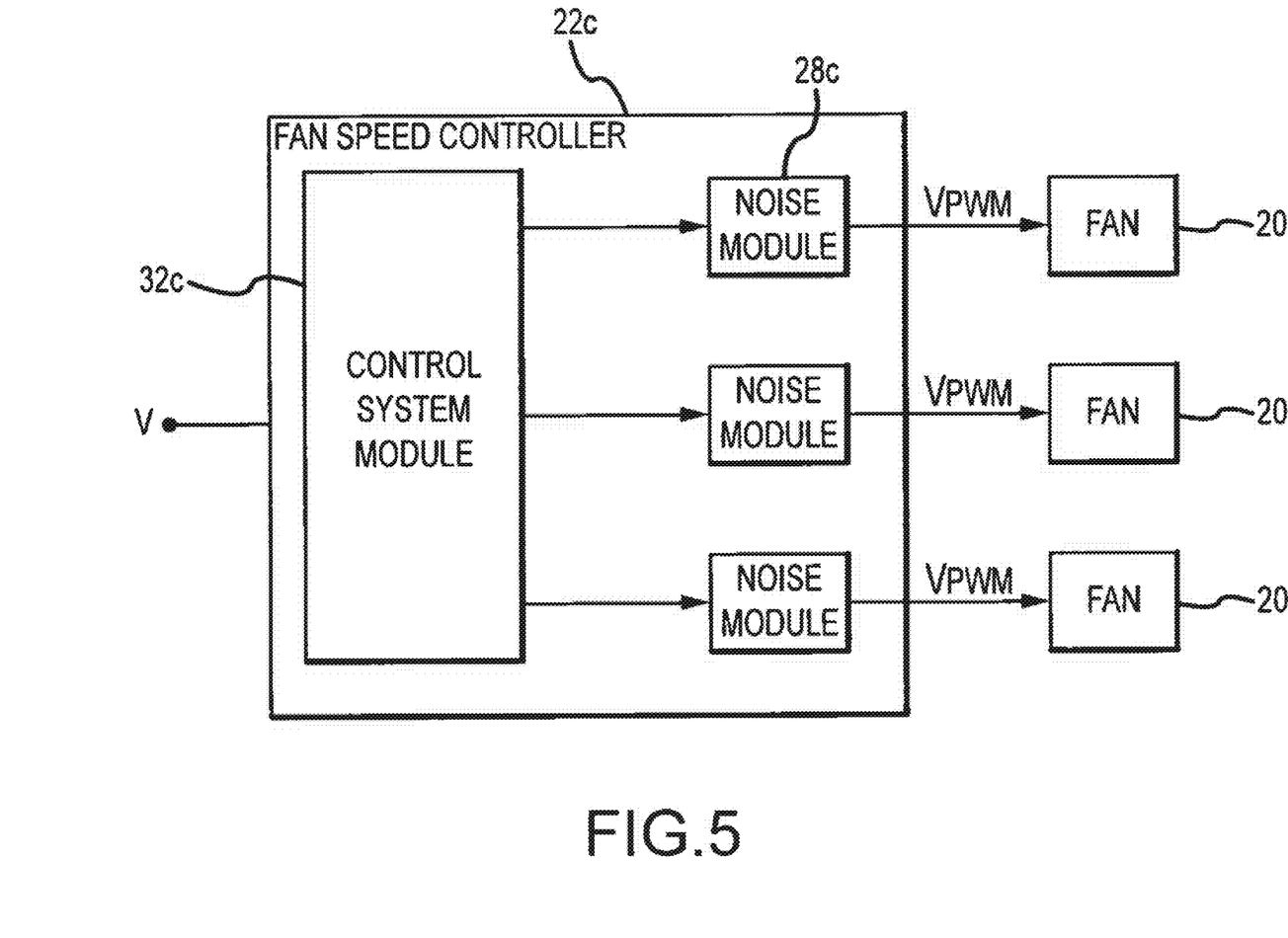
FIG. 5 illustrates a functional block diagram of another embodiment of spread-spectrum fan control for the air-cooled server system of FIGS. 1A-B.

FIG. 5 illustrates yet another embodiment of spread-spectrum fan control for adding noise to the PWM control signal(s) ($V_{PWM}$). Corresponding components between the embodiments of FIGS. 2 and 5 are identified by the same reference numerals. Those corresponding components that differ in some respect are identified by a "c." In this embodiment, the PWM duty cycle set point control is implemented in software. For example, a fan speed controller $22c$ may be a fan control processor (e.g., microprocessor) that includes a control system software module $32c$ and one or more noise generation software modules $28c$. The control system modules $32c$ execute fan control software that computes one or more PWM control signals ($V_{PWM}$) according to a conventional fan control algorithm, discussed above. The one or more noise generation modules $34c$ incorporate noise (e.g., Gaussian noise, stochastic noise) into each of the PWM control signals ($V_{PWM}$) to vary the respective duty cycles of each of the PWM control signals ($V_{PWM}$), such that the PWM control signals ($V_{PWM}$) operate the fans 20 at randomly modulated blade-passing frequencies ($F_{BP}$) within a defined range about the blade-passing frequency set point ($F_{BPSP}$) for each of the fans 20.

Figure 6:
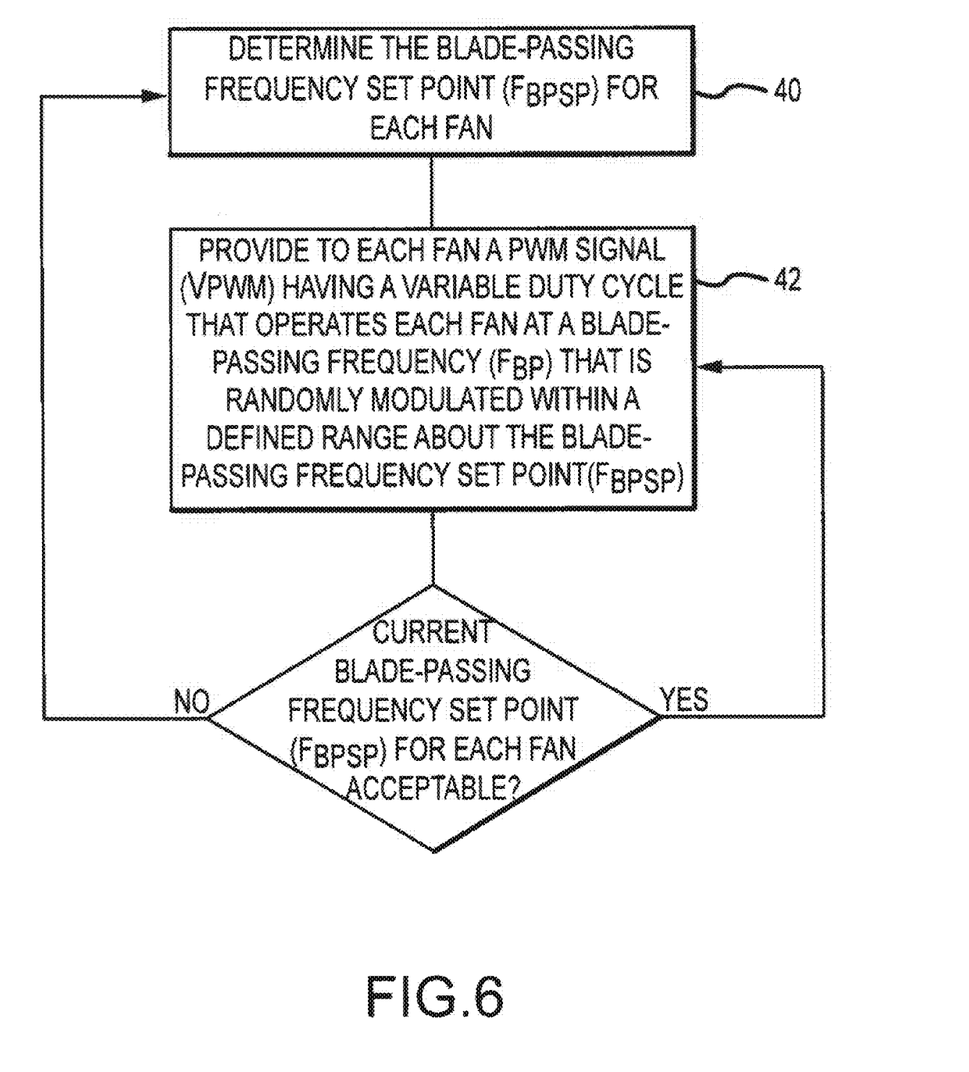
FIG. 6 illustrates a flow-chart detailing the steps for cooling the air-cooled server system of FIGS. 1A-B according to the embodiments of spread-spectrum fan control presented in FIGS. 3-5.

FIG. 6 summarizes the functionality of controlling one or more cooling fans 20 according to the spread-spectrum fan control embodiments discussed above with reference to FIGS. 2-5. First, using the control system 32, the fan speed controller 22 determines the blade-passing frequency set point ($F_{BPSP}$) for each of the fans 20 (step 40). As discussed above, the blade-passing frequency set points ($F_{BPSP}$) may be determined according to a conventional fan control algorithm and may be a function of a temperature, current blade-passing frequency, or other factors. Next, using the PWM generator 34 and the one or more noise generators 28 (e.g., additive noise generators as shown in FIG. 3, noise generation added in hardware/firmware of a fan controller integrated circuit as shown in FIG. 4, noise generation added in software as part of the fan control algorithm running on a fan control processor as shown in FIG. 5), the fan speed controller 22 generates a PWM control signal ($V_{PWM}$) for each of the fans 20 (step 42). The PWM control signal ($V_{PWM}$) has a variable duty cycle that operates each fan 20 at a blade-passing frequency ($F_{BP}$) that is randomly modulated within a defined range about the blade-passing frequency set point ($F_{BPSP}$) for that fan 20. Because the range or bandwidth of frequency modulation is a function of the blade-passing frequency set point ($F_{BPSP}$) for each fan, and because the blade-passing frequency set point ($F_{BPSP}$) for each fan changes to adapt to temperature or other factors, the modulation of the blade-passing frequency changes as the blade-passing frequency set point ($F_{BPSP}$) changes or adapts.

Figure 7:
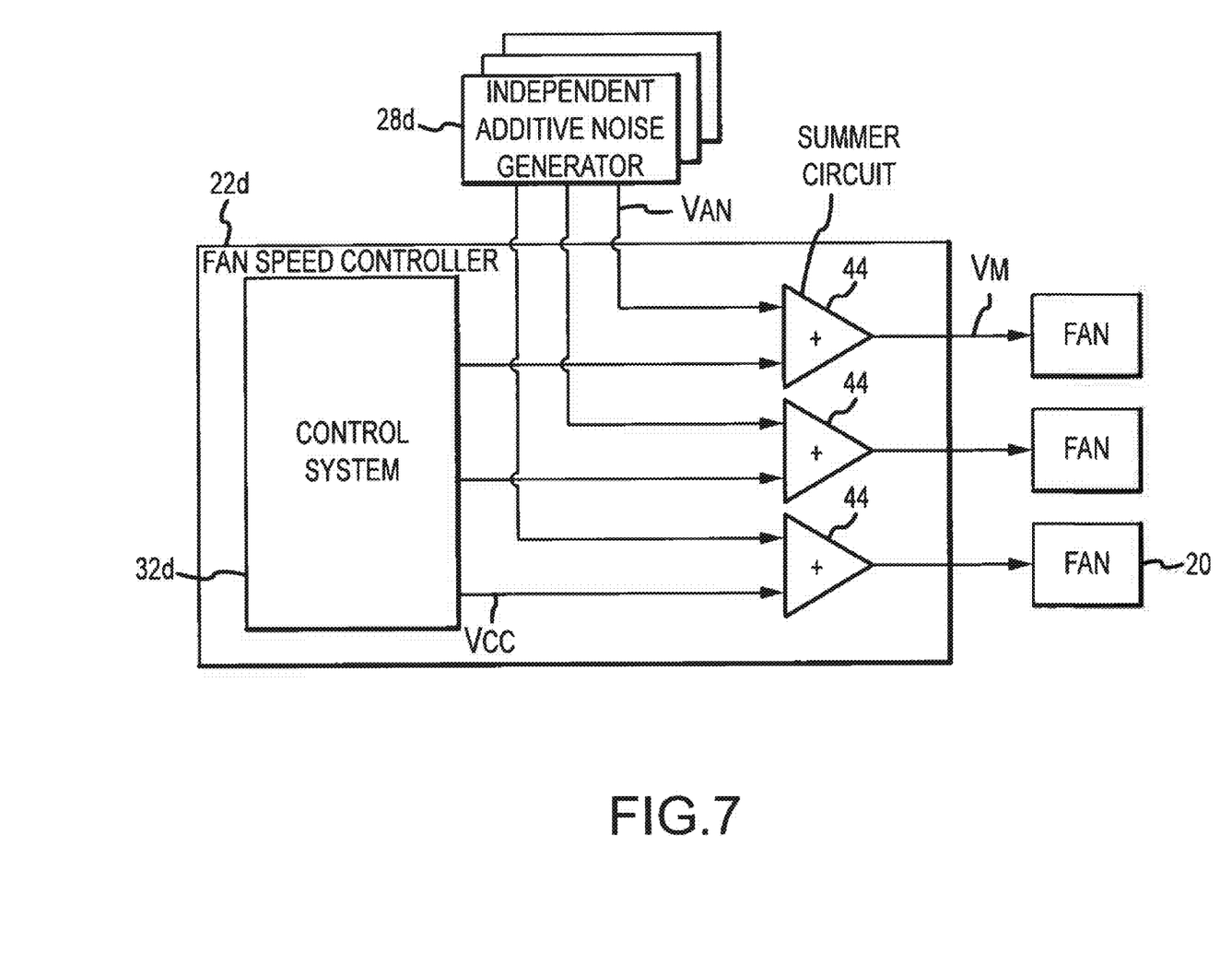
FIG. 7 illustrates a functional block diagram of another embodiment of spread-spectrum fan control for the air-cooled server system of FIGS. 1A-B.

FIG. 7 illustrates one embodiment of spread-spectrum fan control that directly modulates the constant control voltages ($V_{CC}$) (e.g., direct analog control signals) produced for each of the cooling fans 20. In other words, this embodiment does not employ PWM signals to control the fans 20. Corresponding components between the embodiments of FIGS. 2 and 7 are identified by the same reference numerals. Those corresponding components that differ in some respect are identified by a "d."

In this embodiment, a fan speed controller 22d includes a conventional control system 32d for determining and providing one or more constant control voltages ($V_{CC}$) required to operate each of the multiple cooling fans 20 at one or more desired blade-passing frequency set points ($F_{BPSP}$). Using additive voltage noise, each of the constant control voltages or signals ($V_{CC}$) is randomly varied such that the control voltage fed to each of the cooling fans 20 is a modulated control signal ($V_M$) that results in continuously and randomly modulated blade-passing frequencies ($F_{BP}$) about the blade-passing frequency set point ($F_{BPSP}$) associated with each of the cooling fans 20.

More specifically, and as shown in FIG. 7, independent additive noise generators 28d may be coupled with each of the fans 20 such that a band of additive noise ($V_{AN}$) is added to each of the constant control voltages ($V_{CC}$) to produce a modulated control signal ($V_M$) that is fed to each of the fans 20. The additive noise ($V_{AN}$) may be added to each of the constant control voltages ($V_{CC}$) in any appropriate manner including, for example, the use of summer circuits 44 (e.g., inverting or noninverting operational-amplifier summer circuits) that add the voltage noise ($V_{AN}$) directly to each of the constant control voltages ($V_{CC}$). The resulting modulated control signals ($V_M$) that are fed to each of the fans 20 serve to control the fans 20 at blade-passing frequencies ($F_{BP}$) that are continuously and randomly modulated within a defined range about the respective blade-passing frequency set points ($F_{BPSP}$) for each of the fans 20. Similar to the embodiments discussed above, the band of additive noise ($V_{AN}$) may span a percentage of the constant control voltage ($V_{CC}$) required to produce the desired blade-passing frequency set point ($F_{PSP}$) Further, the noise generators 28d may be any appropriate noise generators including, for example, additive Gaussian noise generators, additive stochastic noise generators, noise generation software, or the like.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For instance, while the system and method for spread-spectrum fan control has been described with respect to air-cooled electronic devices, and more particularly, to air-cooled server systems, the system and method is also applicable to any application having a multiplicity of rotating mechanical assemblies (e.g., fans) that cause undesired acoustic or vibrational noise due to high amplitude and strongly tonal frequency output where there is scope available to modulate the rotational frequencies of those mechanical assemblies. Example applications may include air conditioner fans in air conditioning ducting, wind farms, gas or oil pumps interacting through pipe work, and the like.

We claim:

1. An air-cooled server system with one or more heat-generating electrical components, comprising:
a chassis housing the electrical components;
first and second cooling fans disposed within the chassis and providing air cooling to the electrical components;
a fan controller providing a first control signal to the first cooling fan and a second control signal to the second cooling fan; and
one or more noise generators independently and randomly modulating the first and second control signals,
wherein the first and second control signals comprise first and second pulse width modulated ("PWM") signals that control respective first and second blade-passing frequencies of the first and second cooling fans,
wherein the first and second PWM signals have respective first and second duty cycles,
wherein the one or more noise generators cause the first and second duty cycles of the first and second PWM signals to vary in a manner that independently and randomly modulates the first and second blade-passing frequencies within a range around a blade-passing frequency set point, and
wherein the one or more noise generators comprise a first additive noise source indirectly coupled to the first cooling fan and a second additive noise source indirectly coupled to the second cooling fan.

2. The system of claim 1, wherein the first and second duty cycles are uncorrelated.

3. The system of claim 1, wherein the blade-passing frequency set point is a function of a thermal state associated with one or both of the first and second cooling fans.

4. The system of claim 1, wherein the range of blade-passing frequencies around the blade-passing frequency set point is bounded by upper and lower limits that vary from the blade-passing frequency set point by a fraction of a value of the blade-passing frequency set point.

5. The system of claim 1, wherein the blade-passing frequency set point comprises a first blade-passing frequency set point for the first cooling fan and a different second blade-passing frequency set point for the second cooling fan, whereby the range of the blade-passing frequencies comprises first and second overlapping ranges for the first and second cooling fans.

6. The system of claim 1, wherein the range of blade-passing frequencies around the blade-passing frequency set point comprises a first range for the first cooling fan and a different second range for the second cooling fan.

7. The system of claim 1, wherein the independent and random modulation of the first and second blade-passing frequencies within a range around the blade-passing frequency set point is defined by a Gaussian amplitude distribution.

8. The system of claim 1, wherein the fan controller comprises a fan control integrated circuit having a control system and one or more PWM generators, and wherein the control system provides a control voltage to the one or more PWM generators.

9. A method of spread-spectrum control for multiple cooling fans in an air-cooled system, comprising:
with a fan controller, generating a first pulse width modulated ("PWM") signal controlling a blade-passing frequency of a first cooling fan and a second PWM signal controlling a blade-passing frequency of a second cooling fan;
with one or more noise generators, varying a first duty cycle for the first PWM signal to randomly modulate the blade-passing frequency for the first cooling fan within a range around a first blade-passing frequency set point; and
with the one or more noise generators, independently varying a second duty cycle for the second PWM signal to randomly modulate the blade-passing frequency for the second cooling fan within a range around a second blade-passing frequency set point,
wherein the first and second duty cycles are uncorrelated and wherein the ranges for the first and second cooling fans at least partially overlap and wherein the one or more noise venerators comprise an independent additive noise source indirectly coupled to each of the first and second cooling fans.

10. The method of claim 9, wherein the fan controller is implemented in hardware or firmware on a fan control integrated circuit.

11. The method of claim 9, wherein each of the independent additive noise sources comprises a Gaussian noise source.

12. The method of claim 9, wherein the fan controller is implemented with software executing on a fan control processor.

13. The method of claim 9, further comprising limiting attendant electromagnetic noise by restricting a slew rate of the first and second PWM signals or restricting a maximum blade-passing frequency for the first and second cooling fans.

* * * * *

UNITED STATES PATENT AND TRADEMARK OFFICE
CERTIFICATE OF CORRECTION

PATENT NO.        : 8,292,593 B2
APPLICATION NO.   : 12/549542
DATED             : October 23, 2012
INVENTOR(S)       : Derek Orr and Stuart J. McGurnaghan It is certified that error appears in the above-identified patent and that said Letters Patent is hereby corrected as shown below:

Col. 11, lines 7-9 please replace claim 11 with the following rewritten claim:

-- A method of spread-spectrum control for multiple cooling fans in an air-cooled system, comprising:
 with a fan controller, generating a first pulse width modulated ("PWM") signal controlling a blade-passing frequency of a first cooling fan and a second PWM signal controlling a blade-passing frequency of a second cooling fan;
 with one or more noise generators, varying a first duty cycle for the first PWM signal to randomly modulate the blade-passing frequency for the first cooling fan within a range around a first blade-passing frequency set point; and
 with the one or more noise generators, independently varying a second duty cycle for the second PWM signal to randomly modulate the blade-passing frequency for the second cooling fan within a range around a second blade-passing frequency set point,
 wherein the first and second duty cycles are uncorrelated and wherein the ranges for the first and second cooling fans at least partially overlap and
 wherein the one or more noise generators comprise an independent additive noise source indirectly coupled to each of the first and second cooling fans --

Signed and Sealed this
Ninth Day of April, 2013

Teresa Stanek Rea
*Acting Director of the United States Patent and Trademark Office*